United States Patent [19]

Murakoshi et al.

[11] Patent Number: 4,902,085
[45] Date of Patent: Feb. 20, 1990

[54] POLYGON MIRROR

[75] Inventors: Kazuhiko Murakoshi; Toshio Shimura, both of Hachioji, Japan

[73] Assignee: Konica Corporation, Tokyo, Japan

[21] Appl. No.: 201,076

[22] Filed: Jun. 1, 1988

[30] Foreign Application Priority Data

Jun. 4, 1987 [JP] Japan .................................. 62-141203

[51] Int. Cl.$^4$ ............................................. G02B 26/10
[52] U.S. Cl. .................................................... 350/6.8
[58] Field of Search ................... 350/6.5, 6.7, 6.8, 6.9, 350/6.91, 484, 486, 636; 425/568, 569, 570, 571, 573, 588; 264/328.8

[56] References Cited

FOREIGN PATENT DOCUMENTS

| 0029004 | 2/1982 | Japan | 350/6.7 |
| 0015602 | 1/1985 | Japan | 350/6.8 |
| 0122621 | 6/1986 | Japan | 350/6.7 |

Primary Examiner—Bruce Y. Arnold
Assistant Examiner—Ronald M. Kachmarik
Attorney, Agent, or Firm—Jordan B. Bierman

[57] ABSTRACT

The invention provides a rotatable polygon mirror consisting of (a) cylindrical boss being disposed at the center part of polygon and having a hole therein, (b) side plate being disposed at each side of polygon, the outer surface of the side plate forming a mirror surface, (c) connecting-plate for connecting between the cylindrical boss and the side plate, and rib being radially disposed between the cylindrical boss and each corner of polygon.

12 Claims, 6 Drawing Sheets

I-I     II-II     III-III

POLYGON MIRROR

BACKGROUND OF THE INVENTION

The present invention relates to a rotatable polygonal mirror used in an optical apparatus or the like having a laser scanning system, and to a manufacturing process thereof.

A polygonal mirror is usually a mirror that comprises a prism, for example, of a regular octahedral cross-section wherein the side faces thereof serve as reflective mirror faces; the mirror is used to deflect a laser beam to scan the surface that receives the beam.

Conventionally, aluminum alloy or optical glass has been used as a material of such a rotatable polygonal mirror. After being formed into a regular octahedral shape through a milling or grinding process, aluminum alloy is processed by a sintered carbide tool and optical glass is polished and reflective mirror faces are formed.

Polishing of glass requires a large number of processes to achieve the desired smoothness. Therefore, the cost is several times as high as that of metal milling. When metal is used, the material cost and the milling process cost are high. Metal is far from being comparable to molded mirror, with disadvantages such as scattering during optical scanning due to the curved surface made by cutting tools, cavities found in the aluminum material, lower operation efficiency caused by difficulties in processing, and the number of process steps required.

Since rotatable polygonal mirrors made of metal or glass are heavy, a complicated and expensive drive system and control system are required to realize high speed rotation. In addition, a tremendous amount of labor and time is necessary in the above-mentioned manufacturing process to obtain a highly precise rotatable polygonal mirror, which results in high manufacturing cost.

A synthetic resin has also been tried to form a rotatable polygonal mirror. Even if a synthetic resin is used, however, defects such as depressions or shrink marks occur when a mirror exceeds a certain thickness. If thinned portions are provided, ribs are necessary to increase mechanical strength. Then the mirror section will be deformed by centrifugal force at the time of high speed rotation. If injection molding of such a resin is adopted, it is difficult to maintain uniform molding pressure because of the complex shape of a rotatable polygonal mirror. As a result, internal stress causes warpage and depressions, which makes it almost impossible to obtain reflective mirror faces with sufficient mechanical strength and high flatness.

SUMMARY OF THE INVENTION

An object of the invention is to provide a rotatable polygonal mirror with low cost.

Another object of this invention is to provide a rotatable polygonal mirror of synthetic resin having sufficient mechanical strength and high flatness.

Still another object of the invention is to provide a method of manufacturing a rotatable polygonal mirror free from defects occurring in the injection molding process.

The above objective is achieved by a rotatable polygon mirror in which on each side of the polygonal the surface forms a mirror. In such rotatable polygonal mirrors, a boss which forms a center hole and mirror sections are connected with a plate, and ribs are provided radially between such the boss and the joints of each mirror. In the configuration of such rotatable polygonal mirrors, the polygon is resin injection molded.

The mirror surfaces are formed by coating the faces with metal and a protective layer is formed on the metal layer.

The rotatable polygonal mirror made of synthetic resin according to this invention is the substantial equivalent of a metal or glass mirror in durability and flatness of the mirror surface.

According to one embodiment of the invention, a polygonal mirror has mirror face section having a mirror face section which gradually thins from the ends thereof toward the center.

BRIEF DESCRIPTION OF THE DRAWINGS

FIGS. 2 through 6, 7B, 7C, and 8 through 12 show principal portions of the rotatable polygonal mirror.

DETAILED DESCRIPTION OF THE INVENTION

Figure 1:
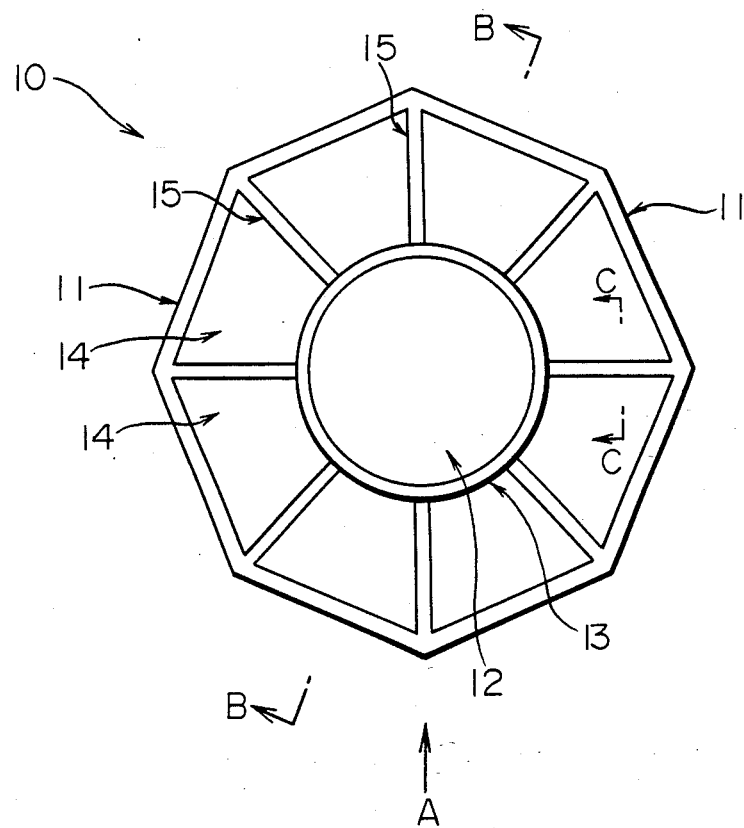
FIGS. 1 and 7A are plan views of the rotatable polygonal mirror of this invention.
Figure 2:
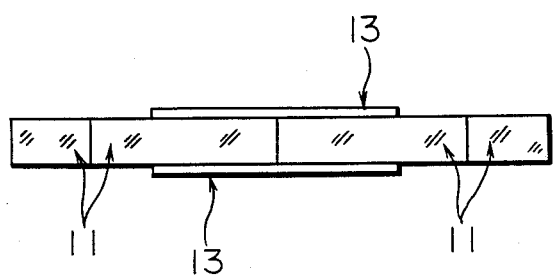
Figure 3:
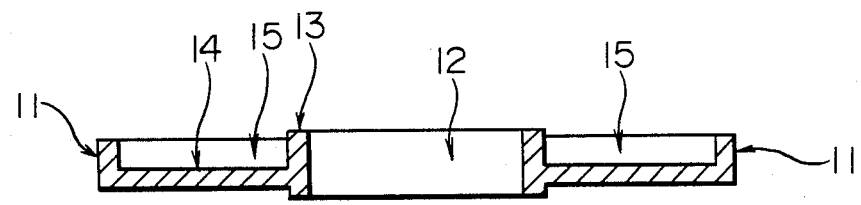
Figure 4:
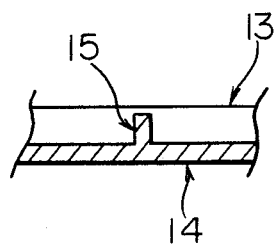

FIGS. 1 through 7 show embodiments of the invention. FIG. 1 shows a rotatable polygonal mirror 10, according to the manufacturing method of this invention viewed from the rotatable axis. FIGS. 2, 3, and 4 are views in the direction of the arrow marks A, BB, and CC respectively.

The rotatable polygonal mirror is preferably a regular octahedral member having eight faces on its periphery. It is an injection molded member, made of thermoplastic resin, formed in one body comprising boss 13 surrounding center hole 12 and connected to each face by plate sections 14 to form a ring.

As a resin material for the rotatable polygonal mirror 10, a polycarbonate is preferably used because it has superior mechanical strength and transferring capability after molding which ensure a high grade finished surface. After molding, aluminum is evaporated onto each face of the polygon to form eight mirror sections 11 as shown in FIG. 2. A protective coating of $SiO_2$ is formed on each surface of mirror sections 11.

A rotary shaft (not shown) engages hole 12 of the rotatable polygonal mirror and is attached to the inner surface of the boss 13. Thus, the rotatable polygonal mirror is driven in unison with the rotary shaft. The direction of a laser beam striking each mirror section is changed to scan the surface that receives the beam.

The mirror section 11 is finished to have a high flatness of 0.02 $\mu$m or less and is required to have a mechanical strength which ensures optical flatness to withstand high speed rotation of 8000 rotations per minute or more. To reinforce the structure of the mirror section 11, each mirror section 11 and the boss 13 are connected by one of ribs 15 which are radially positioned between them and vertically projected from the plate section 14 as shown in FIGS. 3 and 4.

As one example of the principal dimensions of polygonal mirror 10, the side to side distance between mirror sections 11 is about 52 mm, their thicknesses and those of plates 14, are preferably about 2 mm, based on of the finished surface after molding. When the thickness of the rib 15 was 0.7 mm in the above embodiment, considering structural strength, molding was satisfactorily made while sufficiently maintaining the fluidity of the resin material. It may be possible to increase the thickness of the rib 15 within the range where no depressions wil occur.

Figure 5:
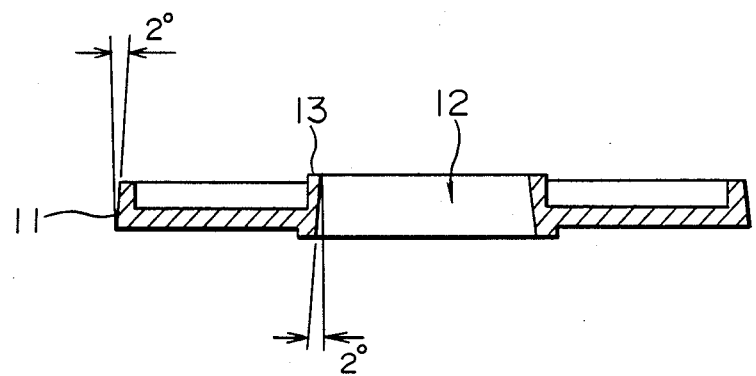

A slant of approx. 2° is provided in the same direction on the face of the mirror section 11 and the inner diameter section of the boss 13 as shown in FIG. 5 so as to facilitate removal from the mold after injection molding is completed. Thus, removal from the mold is accomplished while keeping highly accurate flatness and dimensions without scratching the face of the mirror section 11 and the inner surface of the boss 13.

Figure 6:
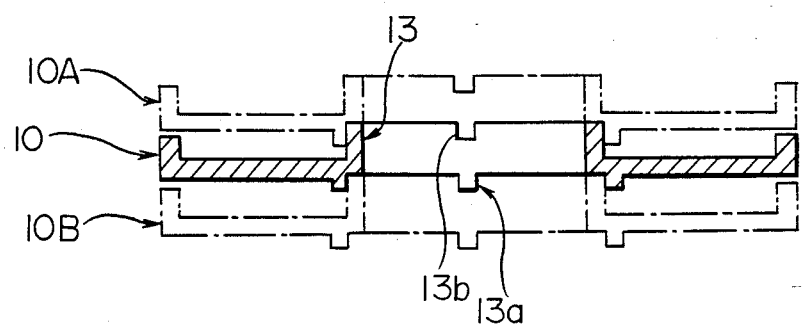

A step is provided on the inner peripheral surface of the boss 13 of the rotatable polygonal mirror 10 as shown in FIG. 6. The outer peripheral section of another boss 13 can be fitted on this step. Thus, rotatable polygonal mirrors 10A and 10B can be stacked as shown by the broken lines in the figure. As a result, evaporation and other surface treatment processes can be performed efficiently. It is also possible to stack a large number of mirrors in this way for the purpose of saving storage space.

As shown in the figure, a convex portion 13a is provided on one side of the boss 13 and a concave portion 13b on the other side to fit the above convex portion 13a. When rotatable polygon mirrors are stacked, the mirrors can be easily positioned by fitting the convex portion 13a into concave portion 13b.

The flatness and strength of the mirror section 11 of the rotatable polygonal mirror which is injection molded are influenced by the shape and locations of the ribs 15. In this invention, each rib 15 is positioned radially from the joint of each mirror to the boss 13 via the plate section 14. When a resin flows from each pin point gate 20, the weld line is generated on each joint of the mirror section 11. As a result, it is possible to obtain a rotatable polygon mirror 10 having mirror sections 11 with extremely high flatness and excellent mechanical strength.

Figure 7A:
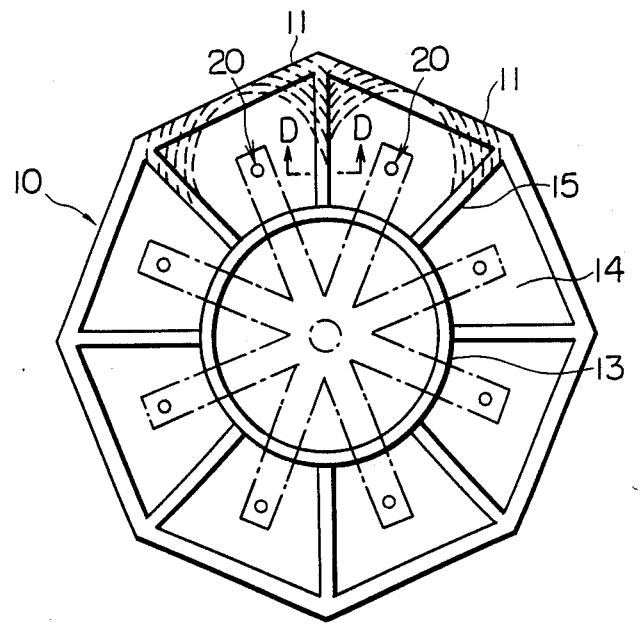

FIG. 7A shows the flow of resin from the pin point gate 20 when a rotatable polygon mirror 10 of the present invention is injection molded.

Eight pin point gates branched radially from a spool are placed in such a manner that they are connected to the plate section 14 on a bisectional line which a at right angle to the reflection mirror face of each mirror section.

When a resin is injected from each pin point gate 20, it spreads in concentric circles as shown by the broken lines on the plate section 14. The weld line is formed along the rib 15 where the resin flows meet due to the fact that the inlet pressures are all the same.

Figure 7B:
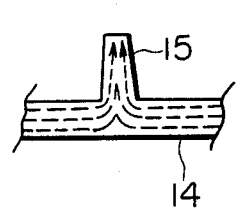
Figure 7C:
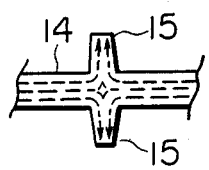

FIG. 7C shows an example in which ribs 15A and 15B are formed symmetrically on both sides of the plate section 14. The flow of the resin is symmetrical also in this case and the weld line comes along the ribs 15A and 15B.

This invention is not limited to the above mentioned mirror section 11 of the rotatable polygonal mirror 10 having an excellent flatness. For example, a reflective surface with optical characteristics described in Japanese Patent Publication Open to Public Inspection No. 61-156020 is also in the scope of this invention.

This invention made it possible to provide a light weight rotatable polygonal mirror made of synthetic resin having high flatness and mechanical strength without applying a large load to the drive and control systems.

In the rotatable polygonal mirror 10, a resin is injected from eight pin point gates which are radially branched as shown in FIG. 7 and forced under pressure to each mirror section 11 via each plate section. Therefore, the distance from the pin point gate 20 to the mirror surface 11 varies according to the part of each mirror section. This results in uneven molding pressure of resin which is applied on the surface of the mirror 11 and may cause warp of deformation after molding. Consequently, there may be a possibility of decreased flatness.

Figure 8:
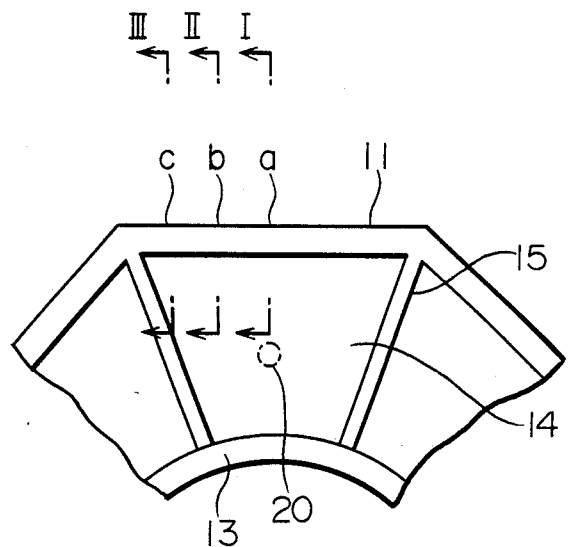

In the rotatable polygonal mirror 10 of the present invention, the thickness of the mirror section 11 is varied as shown in FIG. 8 according to the part of the mirror section 11 so as to achieve uniform molding pressure of resin on any part of the mirror section 11.

Figure 9:
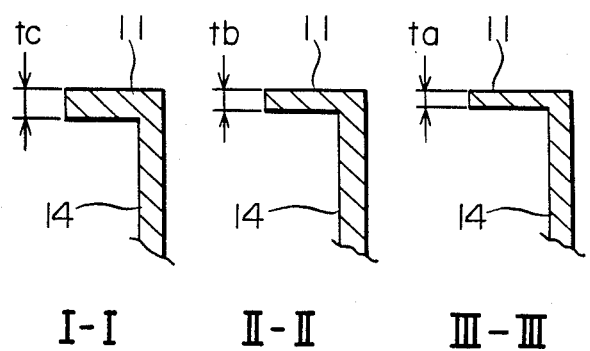

As shown in FIG. 9, the cross sections of the central part (a) of the mirror section 11, the middle part (b), and the end part (c) do not have equal thickness. The thickness (tc) at the end part (c) is the largest and the thickness (ta) at the central part (a) is the smallest. Thus, the thickness gradually decreases toward the center in a symmetrical pattern.

Accordingly, the inner back surface of the mirror section 11 forms a continuous arc as shown in FIG. 8, which makes it possible to control the flow rate of a resin to realize uniform molding pressure on all parts of the mirror section.

The difference in thickness of the mirror section 11 produces a remarkable effect even if such a difference is extremely small. Therefore, it has been confirmed that decreasing the central thickness to a range of 1.5 to 1.8 mm for mirror sections 2 mm thick eliminates residual stress and results in a rotatable polygonal mirror without warpage or deformation.

In the rotatable polygonal mirror 10, a resin is injected from eight pin point gates 20 which are radially branched as shown in FIG. 7 to individually form each mirror section 11 and each plate section. As a result, the weld line is formed along the rib 15.

Each boundary section where adjacent mirror sections 11 join, may be locally thickened where the ribs are connected. Vacuum foams tend to occur inside of such boundary section (a), which decreases mechanical strength. Moreover, the flatness is sometimes decreased by depressions generated on the mirror surface.

Figure 10:
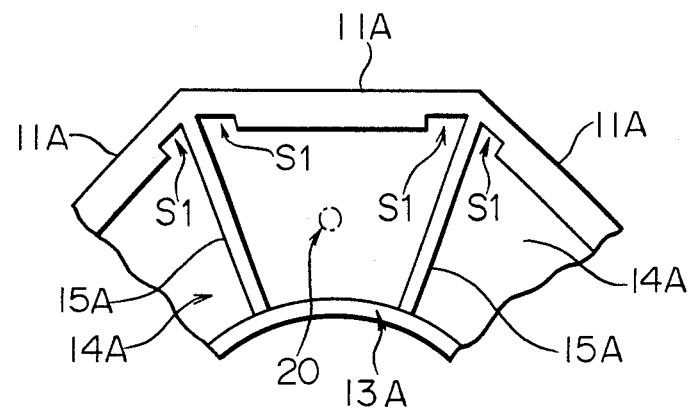
Figure 11:
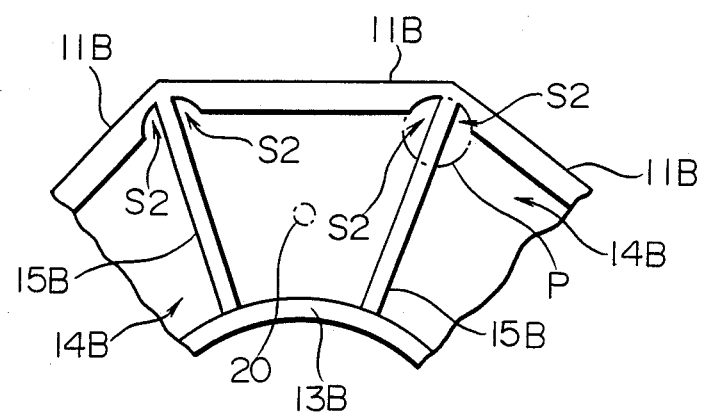

In the rotatable polygonal mirror 10 of this invention, as shown in FIGS. 10 and 11, thinning portions S1 and S2 are provided on each inner part of the boundary sections of the mirror section 11. These portions serve to make pressure of the resin injected into the mirror section 11 and cooling speed after molding uniform over the entire section to prevent cavities and depressions from occurring.

FIG. 10 shows an example of a thinning portion S1 which is provided to linearly lessen the thickness of the mirror section 11A at both ends in a prescribed range. FIG. 11 shows an example of a thinning portion S2 which is provided to lessen the thickness along the rib 15B. In the latter case, especially, a cylindrical member P shown in a broken line can be used, which simplifies mold manufacturing.

As clearly shown in the figures, the thinning portions S1 and S2 do not affect each plate sections 14A and 14B and each rib 15A and 15B.

It is preferable to determine the shape and size of the thinning portions S1 and S2 after making experiments while taking the shape, volume, resin material, and molding conditions of the frame which comprise the mirror sections 11 into consideration.

What is claimed is:

1. A rotatable polygonal mirror comprising a boss at a center of a polygon and having a hole therein,
   side members each constituting a side of said polygon, an outer surface of each of said side members forming a mirror surface, each of said side members having ends at a boundary between adjacent side members, each of said side members having a center intermediate said ends, the thickness of said side members gradually decreasing from said ends toward said center,
   a plate between said boss and each of said side members, and a rib extending radially from said boss to each said boundary.

2. The mirror of claim 1 wherein said boss, said side member, said plate, and said rib are made of resin.

3. The mirror of claim 2 wherein said boss, said side member, said plate, and said rib are molded as a single unit.

4. The mirror of claim 1 wherein said outer surface is covered with a metal film.

5. The mirror of claim 4 wherein said metal film is covered with a protective film.

6. The mirror of claim 1 wherein said side member has a joint at or adjacent a boundary between adjacent side members and is thinner from the inside of said side member at said joint.

7. A rotatable polygonal mirror comprising a boss at a center of a polygon and having a hole therein,
   side members each constituting a side of said polygon, an outer surface of each of said side members forming a mirror surface, each of said side members having ends at a boundary between adjacent side members,
   a plate between said boss and each of said side members, a rib extending radially from said boss to each said boundary, each of said side members having a joint at or adjacent said boundary and being thinner from the inside of each of said side members at or adjacent said joint.

8. The mirror of claim 7 wherein said boss, said side member, said plate, and said rib are made of resin.

9. The mirror of claim 8 wherein said boss, said side member, said plate, and said rib are molded as a single unit.

10. The mirror of claim 7 wherein said outer surface is covered with a metal film.

11. The mirror of claim 10 wherein said metal film is covered with a protective film.

12. The mirror of claim 7 wherein said side member has a joint at or adjacent a boundary between adjacent side members and is thinner from the inside of said side member at said joint.

* * * * *